United States Patent
Barnes et al.

(10) Patent No.: US 10,710,127 B2
(45) Date of Patent: Jul. 14, 2020

(54) HIGH PRESSURE CLEANING LANCE DRIVE SAFETY APPARATUS

(71) Applicant: STONEAGE, INC., Durango, CO (US)

(72) Inventors: Jeffery R. Barnes, Ignacio, CO (US); Stephen L. Galbraith, Ignacio, CO (US); Joseph Schneider, Durango, CO (US)

(73) Assignee: STONEAGE, INC., Durango, CO (US)

( * ) Notice: Subject to any disclaimer, the term of this patent is extended or adjusted under 35 U.S.C. 154(b) by 697 days.

(21) Appl. No.: 15/458,580

(22) Filed: Mar. 14, 2017

(65) Prior Publication Data

US 2017/0274429 A1    Sep. 28, 2017

Related U.S. Application Data

(60) Provisional application No. 62/313,438, filed on Mar. 25, 2016.

(51) Int. Cl.
| | |
|---|---|
| *B08B 9/032* | (2006.01) |
| *F16M 7/00* | (2006.01) |
| *B08B 9/045* | (2006.01) |
| *B08B 9/093* | (2006.01) |
| *F16M 11/24* | (2006.01) |

(52) U.S. Cl.
CPC ............ *B08B 9/0321* (2013.01); *B08B 9/045* (2013.01); *B08B 9/0936* (2013.01); *F16M 7/00* (2013.01); *F16M 11/245* (2013.01)

(58) Field of Classification Search
None
See application file for complete search history.

(56) References Cited

U.S. PATENT DOCUMENTS

| | | | |
|---|---|---|---|
| 2,074,052 A | 3/1937 | George | |
| 4,603,661 A | 8/1986 | Nelson et al. | |
| 4,883,102 A * | 11/1989 | Gabrielyan | ............... B64F 1/28 141/98 |

(Continued)

FOREIGN PATENT DOCUMENTS

| | | |
|---|---|---|
| KR | 20-1995-0018657 U | 7/1995 |
| WO | WO98/40175 A1 | 9/1998 |

OTHER PUBLICATIONS

Extended European Search Report, dated Oct. 18, 2019, from corresponding European Patent Application No. 17770828.6.

(Continued)

*Primary Examiner* — Michael E Barr
*Assistant Examiner* — Jason P Riggleman
(74) *Attorney, Agent, or Firm* — Greenberg Traurig, LLP

(57) ABSTRACT

A flexible cleaning lance safety apparatus is described as including a tripod support structure located close to an opening into an object to be cleaned. A flexible lance drive is fastened to the support structure for driving a high pressure fluid through a lance to the object to be cleaned. A snout tube is connected between the lance drive and an opening into the object to be cleaned. One or more micro pressure valves on each leg of the tripod support structure is operative to sense a predetermined force applied between the support structure and a support surface supporting the tripod support structure. When the predetermined force is sensed this causes the high pressure fluid to be diverted from the lance and the object to be cleaned to atmosphere.

16 Claims, 7 Drawing Sheets

(56) References Cited

U.S. PATENT DOCUMENTS

| | | |
|---|---|---|
| 5,107,873 A | 4/1992 | Clinger |
| 5,129,455 A * | 7/1992 | Boisture ............ B65H 75/4402 |
| | | 122/379 |
| 2004/0119597 A1 * | 6/2004 | Petzold .................. B66C 23/78 |
| | | 340/679 |
| 2011/0062695 A1 | 3/2011 | Bergemann et al. |
| 2011/0180111 A1 | 7/2011 | Clement et al. |

OTHER PUBLICATIONS

International Search Report and Written Opinion, dated Jun. 13, 2017, from corresponding International Patent Application No. PCT/US2017/022294.

\* cited by examiner

HIGH PRESSURE CLEANING LANCE DRIVE SAFETY APPARATUS

CROSS REFERENCE TO RELATED APPLICATIONS

This application claims the benefit of U.S. Provisional Application No. 62/313,438, filed Mar. 25, 2016, which is incorporated by reference herein in its entirety.

BACKGROUND OF THE DISCLOSURE

The present disclosure is directed to high pressure fluid rotary nozzle handling systems. In particular, embodiments of the present disclosure are directed to a safety apparatus for detecting and minimizing danger to personnel from a high pressure cleaning lance inadvertently backing out of a floor or roof drain or otherwise in a situation where a back-out preventer either cannot be installed on the support structure or would be difficult to install.

What is therefore needed is a safety apparatus that can be mounted above or about the drain or other opening that facilitates simplified handling of flexible lances together with a drive that permits an operator to stand clear of the region directly above or around the drain or other opening and which precludes uncontrolled motion of a high pressure flexible cleaning lance.

SUMMARY OF THE DISCLOSURE

A flexible lance drive apparatus in accordance with the present disclosure directly addresses such needs.

One exemplary flexible lance drive apparatus in accordance with the present disclosure includes a flexible lance drive device preferably mounted to the apex of a support frame such as a tripod positioned above the opening of the object to be cleaned. The tripod rests on a horizontal support surface such as a floor, roof or tube sheet. This embodiment of the apparatus has a sensor, preferably a pressure sensing air micro valve switch positioned at the foot or bottom of each tripod leg. Each micro valve switch operates to trigger automatic and immediate bleed-off of control air pressure in the event that the weight sensed by each support leg decreases to a predetermined value. In return, the immediate bleed-off of control air pressure triggers dump, i.e. exhaust of the high pressure fluid pressure applied to a flexible cleaning lance.

An embodiment in accordance with the present disclosure may be viewed as a flexible cleaning lance safety apparatus that includes a support structure located close to, e.g., adjacent or in registry with, an opening into an object to be cleaned, a flexible lance drive fastened to the support structure for driving a lance carrying a high pressure fluid to the object to be cleaned, and one or more micro pressure valves on the support structure operative to sense a predetermined force applied between the support structure and the structure support surface. When the predetermined force is sensed, the high pressure fluid is diverted from the object to be cleaned to atmosphere. This support structure may be a tripod. At least one micro pressure valve is preferably mounted between the support surface supporting the tripod and each leg of the tripod. Each micro pressure valve is preferably connected in series with a pilot valve that is operable to quickly bleed off air pressure applied to an air pressure actuated high pressure fluid dump valve when the predetermined force is sensed. Preferably the tripod has a micro pressure valve mounted at a foot of each leg of the tripod. A snout tube is preferably mounted between the lance drive and the object to be cleaned to direct the lance and shield an operator from any fluid spray from the lance. The safety apparatus preferably further includes a plurality of micro pressure valves connected in series such that the force sensed at any one of the micro pressure valves reaching the predetermined force causes air pressure to one or more pilot valves to decrease. The one or more pilot valves operate an air actuated high pressure dump valve to divert high pressure fluid pressure applied to the flexible lance to atmosphere.

A flexible cleaning lance safety apparatus in accordance with the present disclosure may alternatively be viewed as including a tripod support structure located close to an opening into an object to be cleaned, a flexible lance drive fastened to the support structure for driving a high pressure fluid through a lance to the object to be cleaned, and one or more micro pressure valves on each leg of the tripod support structure operative to sense a predetermined force applied between the support structure and a support surface supporting the tripod support structure. When the predetermined force is sensed, the apparatus causes the high pressure fluid to be diverted from the lance and the object to be cleaned to atmosphere. Each micro pressure valve is connected in series with a pilot valve operable to bleed off air pressure applied to a dump valve when the predetermined force is sensed. The tripod has a micro pressure valve mounted at a foot of each leg of the tripod and the micro pressure valves are preferably connected in series. A snout tube is preferably mounted to the tripod directing a cleaning lance from the drive to the object to be cleaned.

A flexible cleaning lance safety apparatus in accordance with the present disclosure may be viewed as including a tripod support structure located close to an opening into an object to be cleaned, a flexible lance drive fastened to the support structure for driving a lance directing high pressure fluid to the object to be cleaned, a snout tube between the lance drive and an opening into the object to be cleaned, and one or more micro pressure valves on each leg of the tripod support structure operative to sense a predetermined force applied between the support structure and a support surface supporting the tripod support structure. When the predetermined force is sensed this causes the high pressure fluid to be diverted from the lance and the object to be cleaned to atmosphere. Each micro pressure valve is connected in series with a pilot valve. The pilot valve is operable to bleed off air pressure applied to an air actuated high pressure fluid dump valve when the predetermined force is sensed by the pilot valve.

Further features, advantages and characteristics of the embodiments of this disclosure will be apparent from reading the following detailed description when taken in conjunction with the drawing figures.

DETAILED DESCRIPTION

Figure 1:
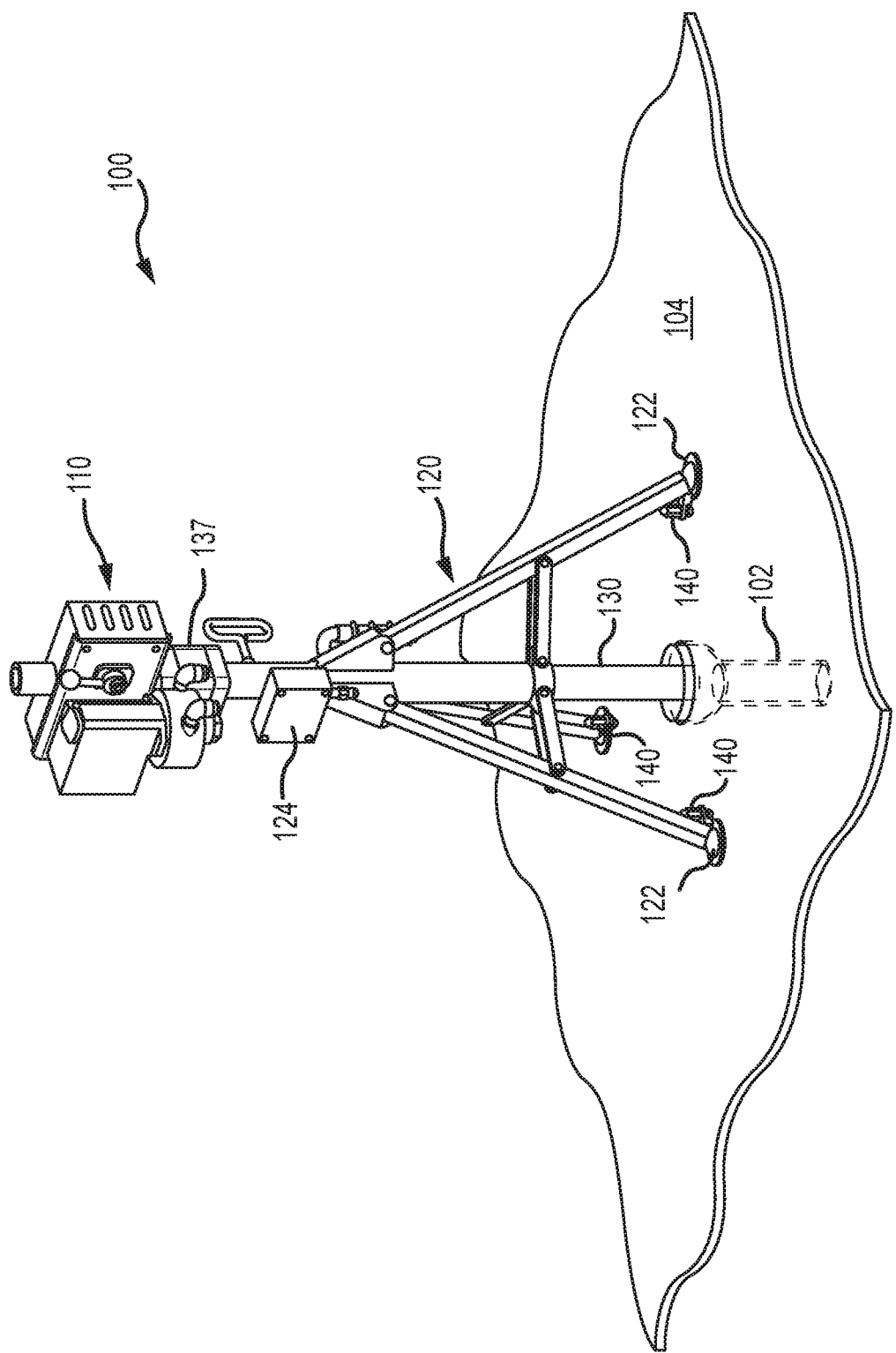
FIG. 1 is a perspective view of a first exemplary embodiment of a flexible lance drive mounted on a lance positioner tripod frame in accordance with the present disclosure oriented directly above a floor or roof drain.

An exemplary drive safety apparatus 100 is shown in FIG. 1. For simplicity of explanation, the flexible lance itself is omitted from the Figures. The apparatus 100 includes a flexible lance drive 110 for inserting and retracting the flexible lance vertically through a snout tube 130 that guides the lance into and out of the drain 102. This exemplary apparatus 100 includes a tripod support structure 120 and a guide sleeve or snout tube 130 positioned coaxially in registry with an opening into a floor drain 102. The support structure 120 rests on a support surface 104 such as a floor, grating, planar tube sheet or roof. Preferably the snout tube 130 is adjusted so as to fit within the floor drain 102 about 2 inches or more below the surface 104. The apparatus 100 may also include a collet block 137 between the drive 110 and the tube 130 for limiting passage of a flexible lance through the snout tube 130.

Figure 2:
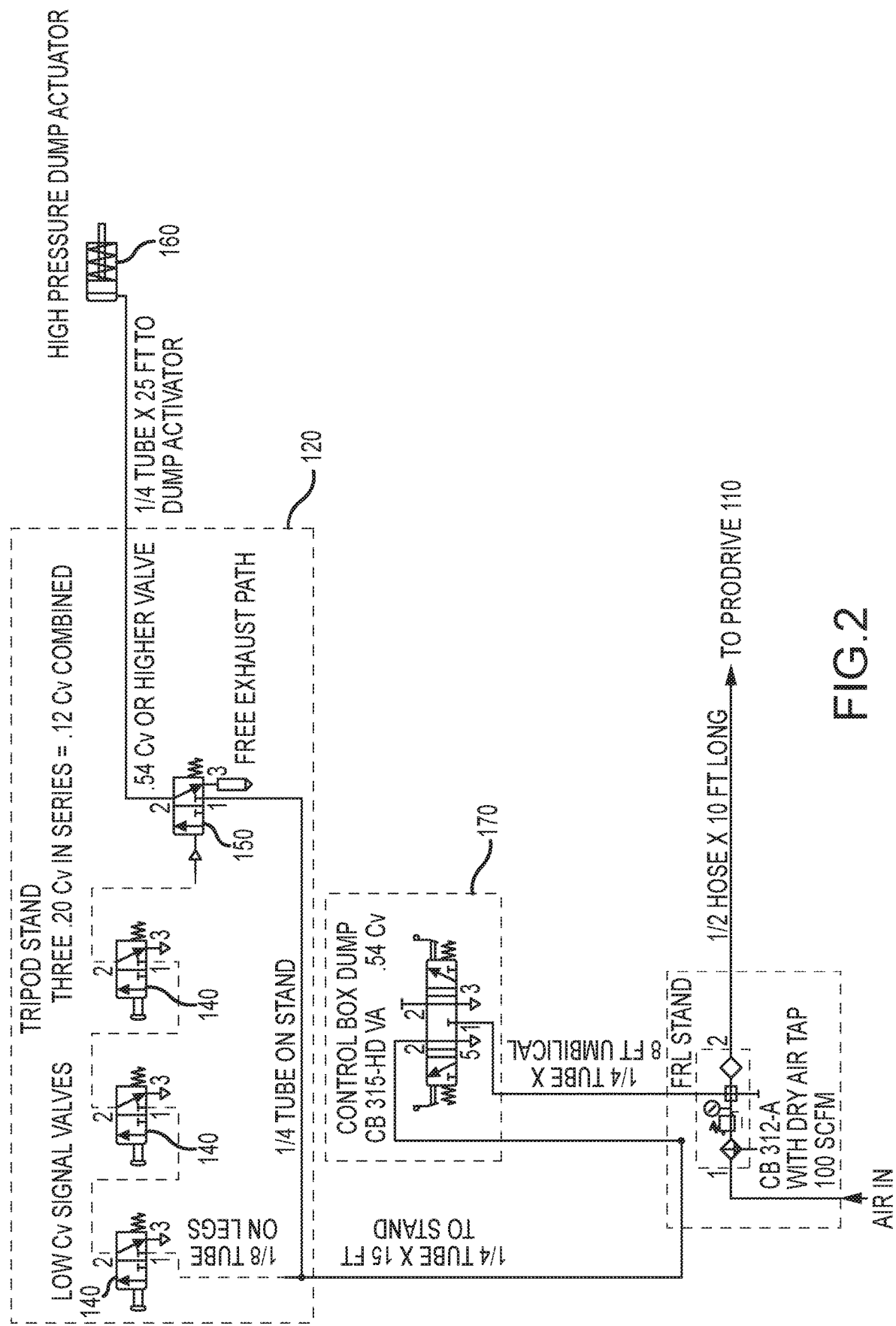
FIG. 2 is a first schematic diagram of air valves arranged in accordance with the present disclosure.
Figure 3:
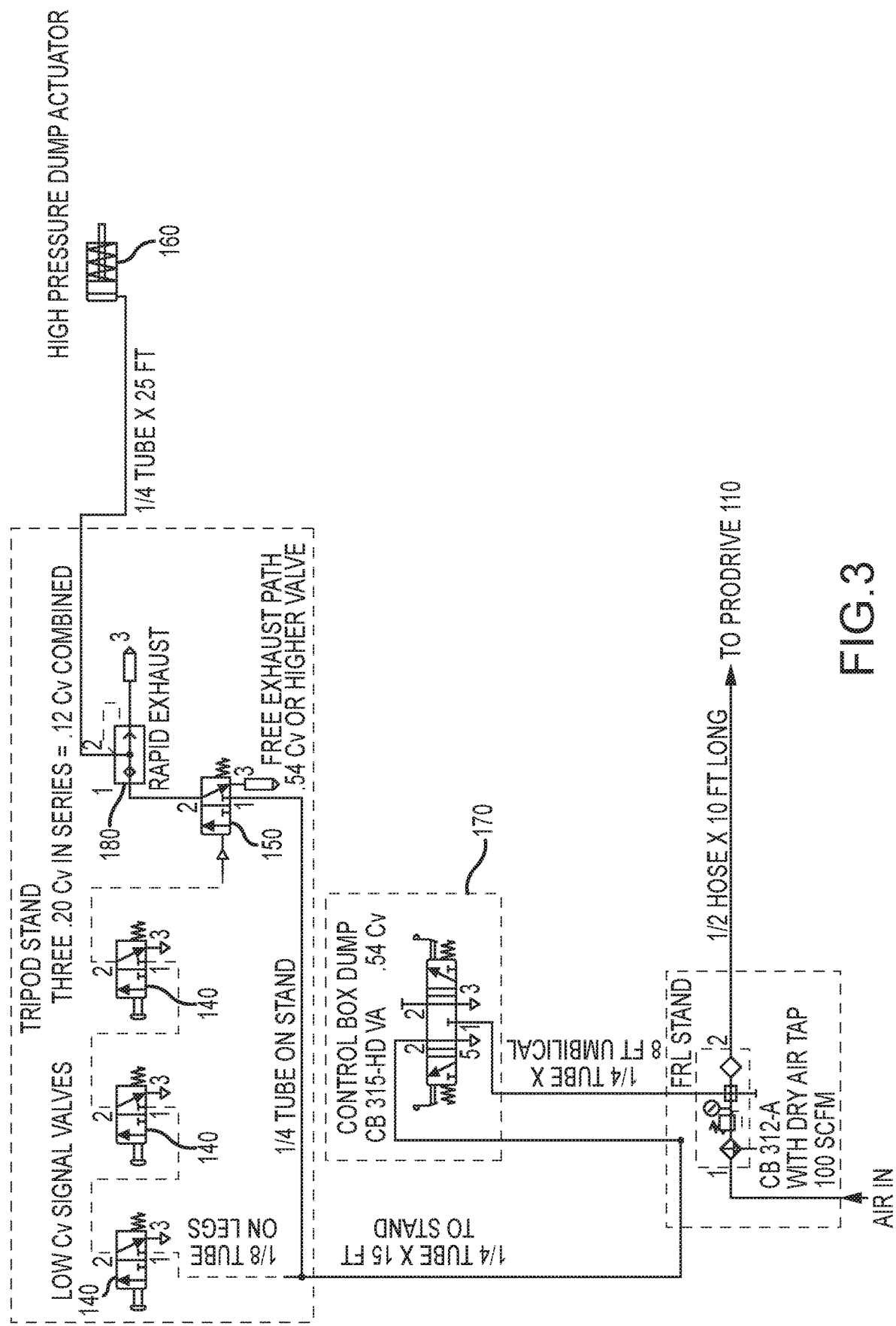
FIG. 3 is a second schematic air diagram of an alternative configuration in accordance with the present disclosure.
Figure 4:
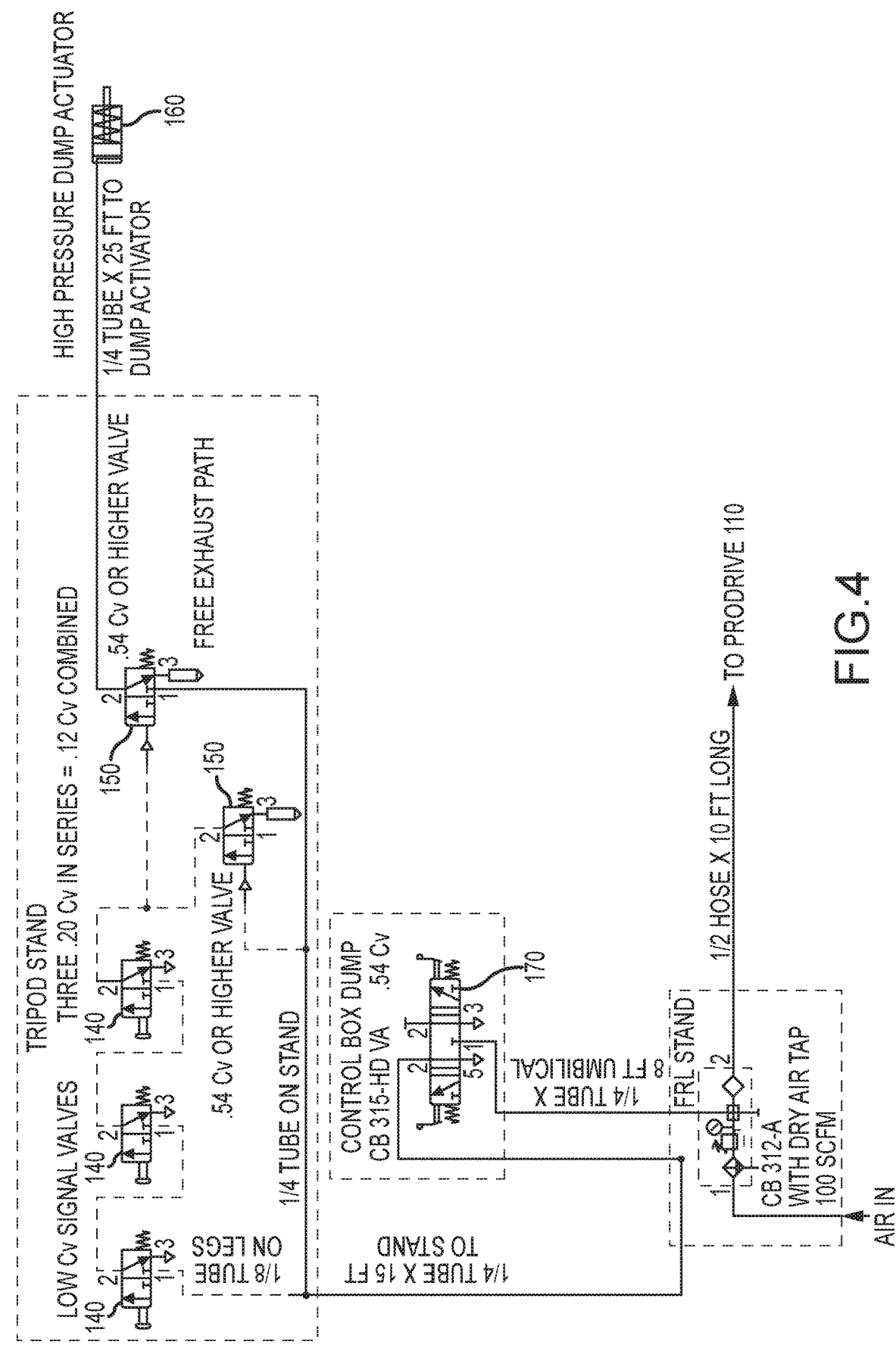
FIG. 4 is an alternate schematic air diagram of the safety apparatus shown in FIG. 1.

Attached to each of the tripod feet 122 of the tripod support 120 is pressure sensor such as a push button micro pressure valve switch or simply "micro valve" 140. Air pressure circuit diagrams for these switches are shown in FIGS. 2 through 4. Referring now to FIG. 2, for example, each of these micro pressure valves 140 is connected in series to a piloted valve 150 mounted in a box 124 fastened to the apex of the tripod support structure 120. So long as each of the three micro pressure valves 140 remain pressurized, the piloted valve 150 remains open, providing a pressure signal or "on" signal to the high pressure water pressure actuator 160 on the operator's control panel (not shown in FIG. 1). So long as the pressure signal is provided to the piloted valve 150, air pressure is supplied to the high pressure dump actuator 160 on the operator's control panel. An operator may turn on and supply high pressure water to the lance (not shown) being guided and driven via apparatus 100 only when air pressure is supplied to the high pressure dump actuator 160. The high pressure dump actuator 160

In the event that one of the tripod legs becomes unbalanced causing loss of pressure in the series connected string of micro pressure valves 140 to the piloted valve 150, the piloted valve shifts, dumping air pressure from the high pressure water dump actuator 160. This action in turn diverts high pressure water flow to the flexible lance to atmosphere rather than sending it only to the lance, by opening a dump valve (not shown). Signal loss to the piloted valve 150 caused by any or all of the three feet losing contact with the ground will result in loss of pressure to the micro pressure valves 140. Loss of this pressure in turn, via the piloted valve 150, will override an operator who may be providing an "on" signal to the high pressure water actuator 170 on the operator's control console, and automatically divert or dump high pressure water away from the flexible lance and its tool, thus providing an enhanced safety margin for the operator in the event of an unanticipated movement or tipping of the tripod support structure 120 of the safety apparatus 100.

FIG. 3 shows another embodiment of the air pressure control apparatus 100 in which an additional rapid exhaust valve 180 is present in series with the piloted valve 150. This fast acting valve 180 shortens the time required for the air pressure to completely exhaust thus shortening the time between sensing a tipping of the tripod support 120 and the complete shutdown of fluid flow to the lance.

FIG. 4 shows an alternative embodiment of the apparatus 100 in which two pilot valves 150 are arranged in parallel to reduce the bleed-down time of the air pressure in the event of one of the sensor micro valves 140 reaching its set point pressure. Alternatively one or more micro valves 140 may also be mounted on the snout tube 130.

Furthermore, a back-out preventer may be fastened to the snout tube 130 or to the opening into the drain 102 to prevent a flexible lance from backing out of the drain opening or other opening into a piping system or other object being cleaned. One such back-out preventer is shown installed in FIGS. 6 and 7.

Figure 5:
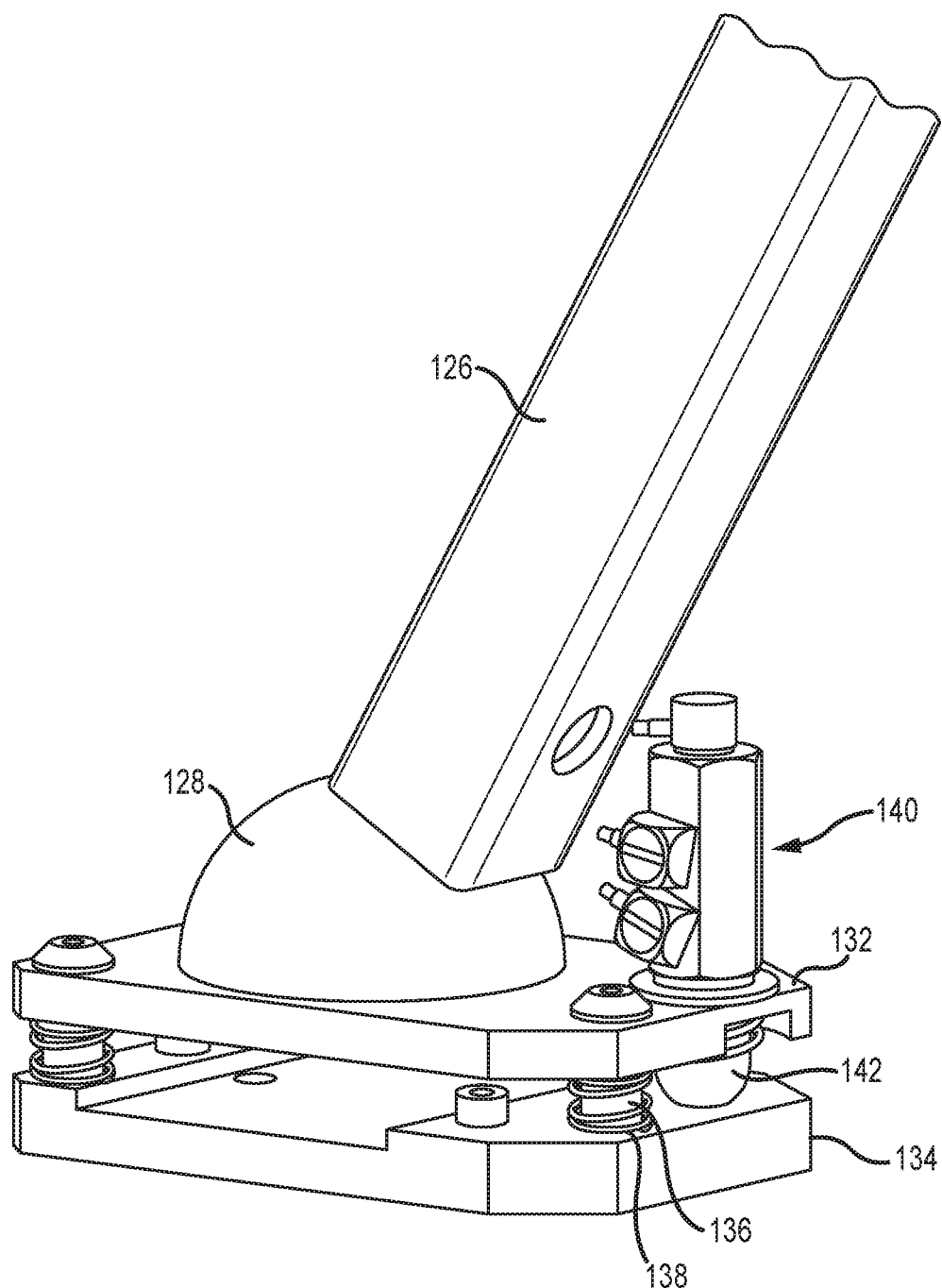
FIG. 5 is an enlarged perspective view of one of the legs of the tripod frame shown in FIG. 1.

FIG. 5 shows a close-up perspective view of the foot end of one of the tripod legs 126. This foot end of leg 126 may be fastened to a dome foot member or rotatably mounted to swivel joint foot which has a dome portion 128 and a flat plate portion 132. Plate portion 132 is spaced parallel to a flat base plate 134. The flat base plate 134 is the component that actually touches the support surface 104, whether it be a floor, a grate, tube sheet, or other structure. A plurality of screws 136 fastened to the base plate 134 each has a coil spring 138 around it that biases the plate portion 132 away from the base plate 134.

The micro pressure valve 140 is fastened to the plate portion 132 and has a plunger 142 that presses against the upper surface of the base plate 134. The micro valve 140 is set such that when the baseplate 134 is fully spaced by the springs 138 from the plate portion 132, air pressure is removed from the dump actuator 160. Only when the baseplate 134 is compressed toward the plate portion 132 by the weight of the leg 126 and its portion of the apparatus 100 ultimately against the support surface 104 will micro pressure valve 140 be closed. Hence the apparatus 100 senses when it is properly resting on the support surface. Lifting of one or more of the legs 126 off of the support surface 104 opens the micro pressure valve 140 causing dump of high pressure fluid as above described. Utilizing this configuration of the apparatus 100 permits it to be utilized on floor grating, a horizontal tube sheet, a solid floor, or virtually any other surface having three points of contact for the legs 126 of the tripod stand 120.

Figure 6:
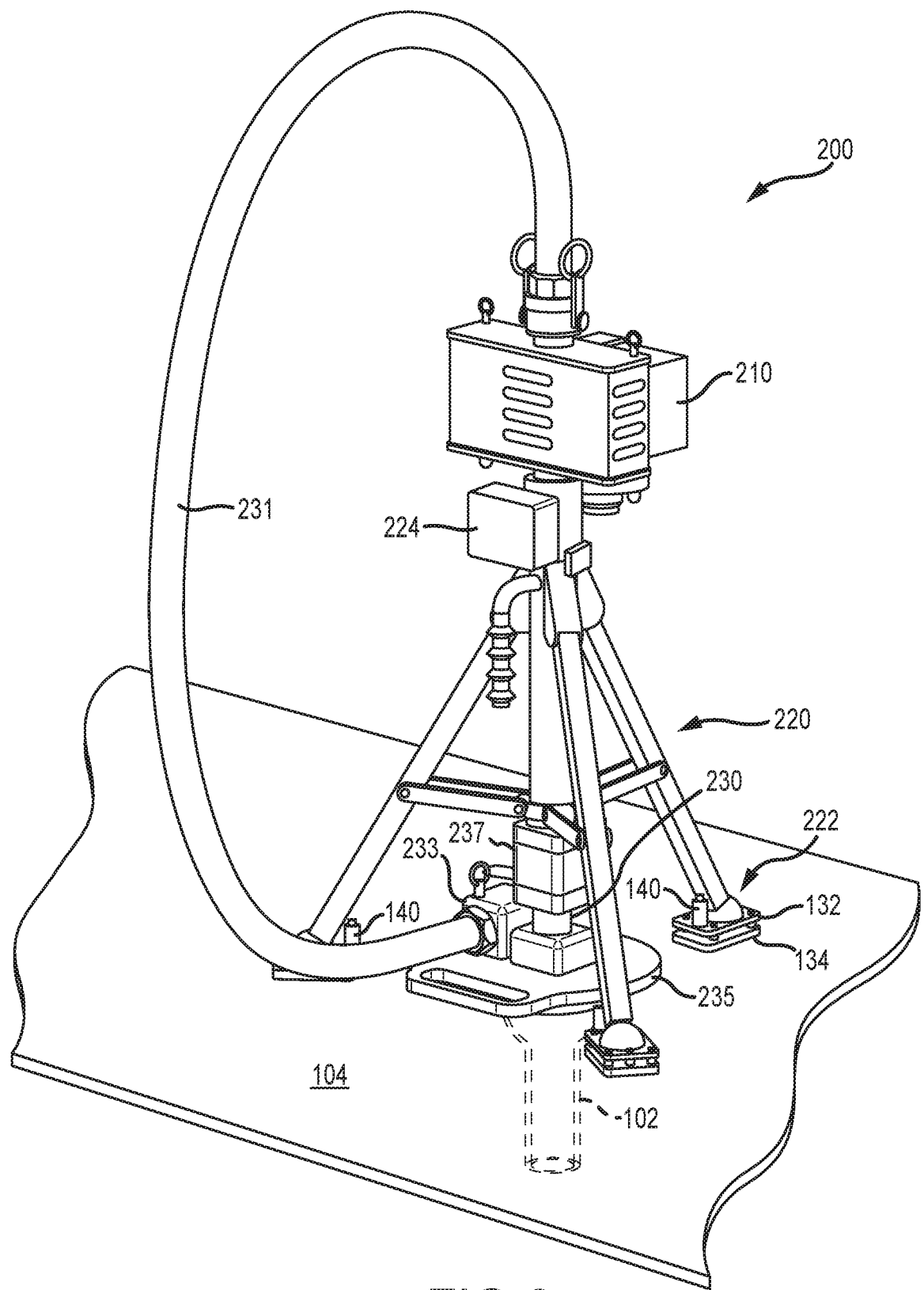
FIG. 6 is a perspective view of a second exemplary embodiment in accordance with the present disclosure.
Figure 7:
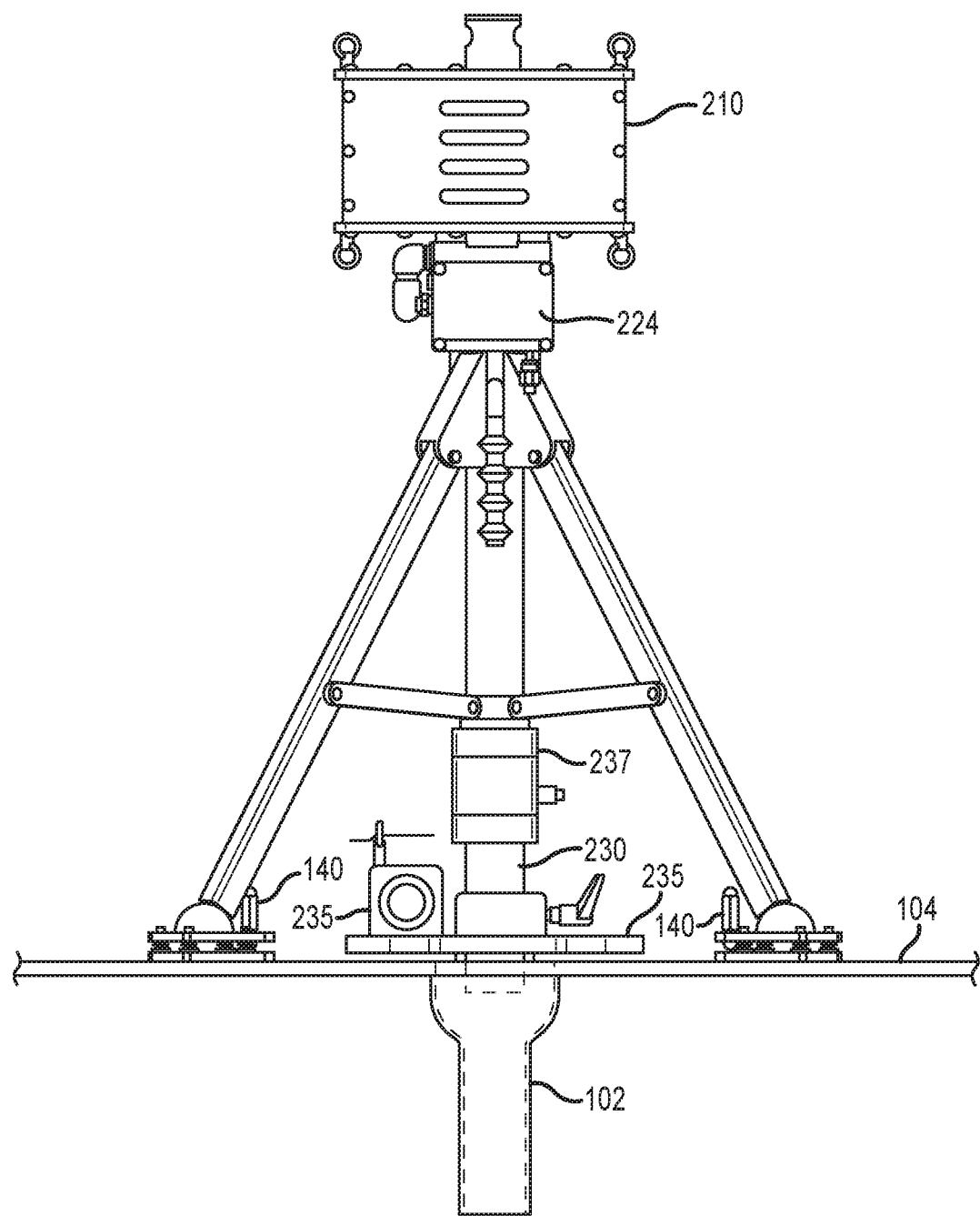
FIG. 7 is a side view of the embodiment in accordance with the present disclosure shown in FIG. 6.

FIGS. 6 and 7 illustrate an alternative embodiment of a safety drive apparatus 200 in accordance with the present disclosure. For simplicity of explanation, again, the flexible lance itself is omitted from FIGS. 6 and 7. The apparatus 200 includes a flexible lance drive 210 for inserting and retracting the flexible lance vertically through a snout tube 230 that guides the lance into and out of the drain 102. This exemplary apparatus 200 includes a tripod support structure 220 and a guide or snout tube 230 positioned coaxially in registry with an opening into a floor drain 102. The support structure 220 is a collapsible tripod that has a central sleeve and three collapsible legs each attached to one of the tripod feet 222 that rests on a support surface 104. The snout tube 230 passes through the sleeve from the drive 210. Preferably the snout tube 230 is adjusted so as to fit within the floor drain 1-2 inches or more below the surface 104 as is most clearly shown in the side view of FIG. 7. During operation, side to side vibration or movement of the support structure 200 on the surface 104 may be small enough not to actuate the micro valve switches 140. Installing the snout tube 230 into the opening helps maintain support structure alignment and may prevent this arrangement of the snout tube 230 from lateral movement or misalignment with the opening 102.

Attached to each of the tripod feet 222 of the tripod support 220 is a push button micro pressure valve switch 140. Each of these micro pressure valves 140 is connected in series to a piloted valve 150 mounted in a box 224 fastened to the apex of the tripod support structure 220. So long as each of the three micro pressure valves 140 remain pressurized, the piloted valve 150 remains open, providing a pressure signal or "on" signal to the air operated high pressure water pressure dump actuator 160 on the operator's control panel (not shown). So long as the pressure signal is provided to the piloted valve 150, air pressure is supplied to the high pressure dump actuator 160 on the operator's control panel. An operator may turn on the drive 210 and feed or retract the flexible lance through the apparatus 200. However, the operator may supply high pressure water to the lance (not shown) being guided and driven via apparatus 200 only when air pressure is supplied to the air operated high pressure water dump actuator 160.

Apparatus 200 is identical to apparatus 100 except for addition of a flexible hose guide tube 231, location of a collet block 237 below the tripod sleeve and the drive 210 on the snout tube 230 and addition of a back-out preventer plate 235 around the snout tube 230. In this embodiment 200, the drive 210 is directly fastened to the upper end of the snout tube 230. The collet block 237 is relocated low on the snout tube 230 below the tripod sleeve and is again utilized to prevent the flexible lance from backing up through the drive 210. The back-out preventer plate 235 is removably fastened to the snout tube 230 close to the support surface 104. One end of the flexible hose guide tube 231 is fastened to the back-out preventer plate 235 via a fitting 233. The other end of the flexible hose guide tube 231 is routed up and around to feed the flexible lance down through the lance drive 210. This arrangement lowers the center of mass of the apparatus 200. When the lance drive 210 is operated to pull and/or push the flexible lance hose through the guide snout tube 230 the pull on the hose supply (not shown) is placed closer to, and parallel to the support surface 104. This arrangement lessens the operational torque placed on the safety apparatus 200 during operation to reduce the potential to tip over the tripod support 220. The addition of the back-out preventer 235 also reduces any spray and splash back out of the drain 102. In addition, if a tool on the end of the flexible lance were to turn around in the pipe, the splash plate of the backout preventer 235 prevents such a tool from escaping due to the small gap, which would also tend to tip the support structure 220 causing dump of the high pressure water.

In alternative embodiments, electronic sensors such as piezoelectric strain gauges, electrical or hydraulic actuators and motors may be used in place of the air micro valve sensors, pneumatic actuators and air drive motors shown and described. A support configuration other than three legs may be utilized. For example, a wheeled structure might be provided with two, three or four wheels, one at each corner of the frame structure. In such a case, additional pressure valves would be needed, one for each leg, and the sensitivity would necessarily be somewhat modified. Alternatively, or in addition, one or more micro valves or other sensors could be attached to the snout 130 in such a way as to detect undue force directly applied on the snout 130. Again, such micro valve(s) would be connected in series with the pilot valve 150. The flexible lance drive 110, 210 mounted on the apex of the tripod support 120, 220 or other support frame may be other than as specifically shown. It is to be understood that the embodiments shown are but exemplary setups of the apparatus 100 and 200 in accordance with the present disclosure.

Furthermore, the apparatus 100 and 200 need not be utilized with floor or roof drains. Each may also be adapted to and applied to any piping configuration to be cleaned, so that an operator may stand clear of the access to such piping configuration during the cleaning operation while at the same time the apparatus senses and diverts fluid flow away from the flexible cleaning lance in the event of sensed pressure on the supportive frame structure reaching, i.e. decreasing to a predetermined value. While the embodiments shown are directed to an apparatus 100 or 200 positioned directly above the opening, e.g., floor drain 102, other orientations are within the scope of the present disclosure. For example, where an inclined orientation is required, the micro pressure valves 140 on each tripod foot may be calibrated appropriately such that a change from a static, or rest, configuration, would trigger actuation of the pilot valve 150 with resulting release of pressure from dump actuator 160.

All such changes, alternatives and equivalents in accordance with the features and benefits described herein, are within the scope of the present disclosure. Such changes and alternatives may be introduced without departing from the spirit and broad scope of this disclosure as defined by the claims below and their equivalents.

What is claimed is:

1. A flexible cleaning lance safety apparatus comprising:
   a support structure adapted to be placed on a support surface and located above an opening into an object to be cleaned;
   a flexible lance drive fastened to the support structure for driving a flexible lance directing a high pressure fluid to and into the object to be cleaned;
   an air operated dump valve connected to the high pressure fluid; and
   one or more sensors between the support structure and the support surface connected to an air pressure supply connected to the air operated dump valve, wherein the one or more sensors are each configured to sense a predetermined force applied between the support structure and the support surface wherein when the predetermined force is sensed, the high pressure fluid in the flexible lance is diverted from the object to be cleaned via actuation of the air operated dump valve.

2. The flexible cleaning lance safety apparatus according to claim 1 wherein the support structure is a tripod.

3. The flexible cleaning lance safety apparatus according to claim 2 wherein each of the one or more sensors is a micro pressure valve connected to the air pressure supply and further comprising at least one micro pressure valve mounted between the support surface supporting the tripod and at least one leg of the tripod, wherein each micro pressure valve is connected in series with a pilot valve operable to bleed off air pressure applied to the air operated dump valve when the predetermined force is sensed.

4. The flexible cleaning lance safety apparatus according to claim 3 wherein the tripod has a micro pressure valve mounted at a foot of each leg of the tripod.

5. The flexible cleaning lance safety apparatus according to claim 1 further comprising a snout tube directing the flexible lance from the flexible lance drive to the object to be cleaned.

6. The flexible cleaning lance safety apparatus according to claim 3 further comprising a plurality of micro pressure valves connected in series with each other such that the force sensed at any one of the micro pressure valves reaching the predetermined force causes the high pressure fluid to divert to atmosphere.

7. The flexible cleaning lance safety apparatus according to claim 5 wherein the support structure is a tripod.

8. The flexible cleaning lance safety apparatus according to claim 7 further comprising at least one micro pressure valve mounted between a support surface supporting the tripod and each leg of the tripod, wherein each micro pressure valve is connected with a pilot valve operable to quickly bleed off air pressure applied to the micro pressure valves when the predetermined force is sensed.

9. The flexible cleaning lance safety apparatus according to claim 8 wherein the at least one pilot valve operates to divert fluid pressure applied to the flexible lance to atmosphere.

10. A flexible cleaning lance safety apparatus comprising:
   a tripod support structure adapted to be placed on a surface located close to an opening into an object to be cleaned;
   a flexible lance drive fastened to the support structure for driving a flexible cleaning lance directing high pressure fluid to the object to be cleaned; and
   one or more micro pressure valves on each leg of the tripod support structure operable to sense a predetermined force applied between the support structure and the surface and when the predetermined force is sensed, cause the high pressure fluid to be diverted to atmosphere via an air operated high pressure fluid dump valve.

11. The flexible cleaning lance safety apparatus according to claim 10 wherein each micro pressure valve is connected with a pilot valve operable to bleed off air pressure applied to the air operated high pressure water dump valve when the predetermined force is sensed.

12. The flexible cleaning lance safety apparatus according to claim 10 wherein the tripod has a micro pressure valve mounted at a foot of each leg of the tripod and wherein the micro pressure valves are connected in series.

13. The flexible cleaning lance safety apparatus according to claim 10 further comprising a snout tube directing the cleaning lance from the flexible lance drive to the object to be cleaned.

14. A flexible cleaning lance safety apparatus comprising:
   a tripod support structure located close to an opening into an object to be cleaned;
   a flexible lance drive fastened to the support structure for driving a lance carrying high pressure fluid to the object to be cleaned;
   a snout tube directed between the lance drive and the opening, into the object to be cleaned; and
   one or more micro pressure valves on at least one leg of the tripod support structure connected to an air operated high pressure fluid dump valve, wherein each of the one or more micro pressure valves is operative to sense a predetermined force applied between the support structure and a support surface supporting the tripod support structure, wherein when the predetermined force is sensed, the one or more micro pressure valves actuate to cause the high pressure fluid to be diverted from the lance and the object to be cleaned to atmosphere via the dump valve.

15. The flexible cleaning lance safety apparatus according to claim 14 wherein the micro pressure valves are connected to a pilot valve and in series with each other and wherein the pilot valve is operable to bleed off air pressure applied to the micro pressure valves when the predetermined force is sensed.

16. The flexible cleaning lance safety apparatus according to claim 14 wherein the tripod has a one of the micro pressure valves mounted at a foot of each leg of the tripod and wherein the micro pressure valves are connected in series.

* * * * *